March 10, 1964  J. M. ANDREWS  3,124,733
PERMANENT MAGNET MOTORS
Filed June 6, 1960  5 Sheets-Sheet 1
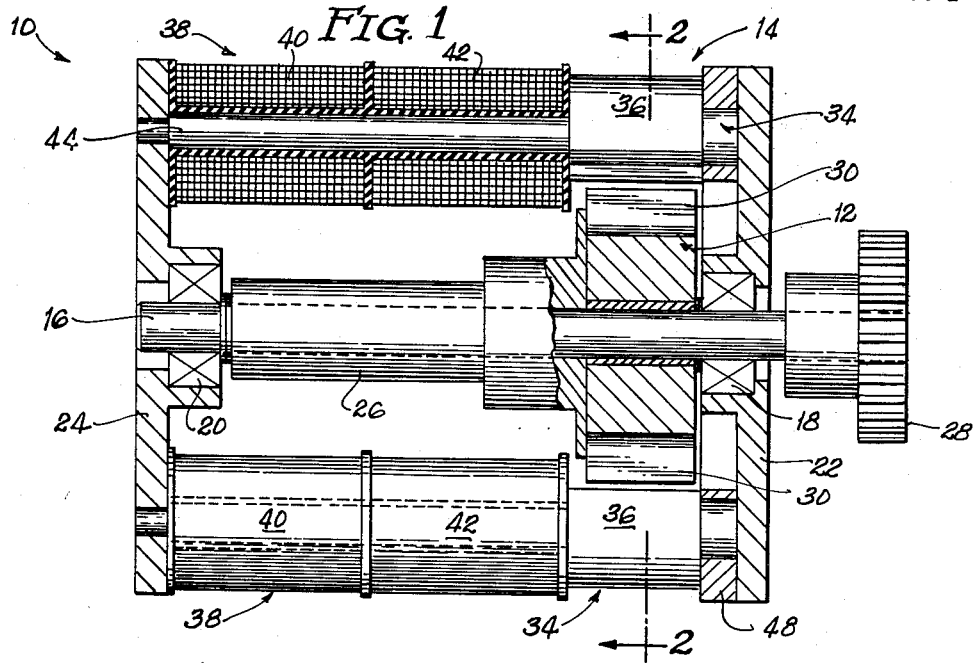
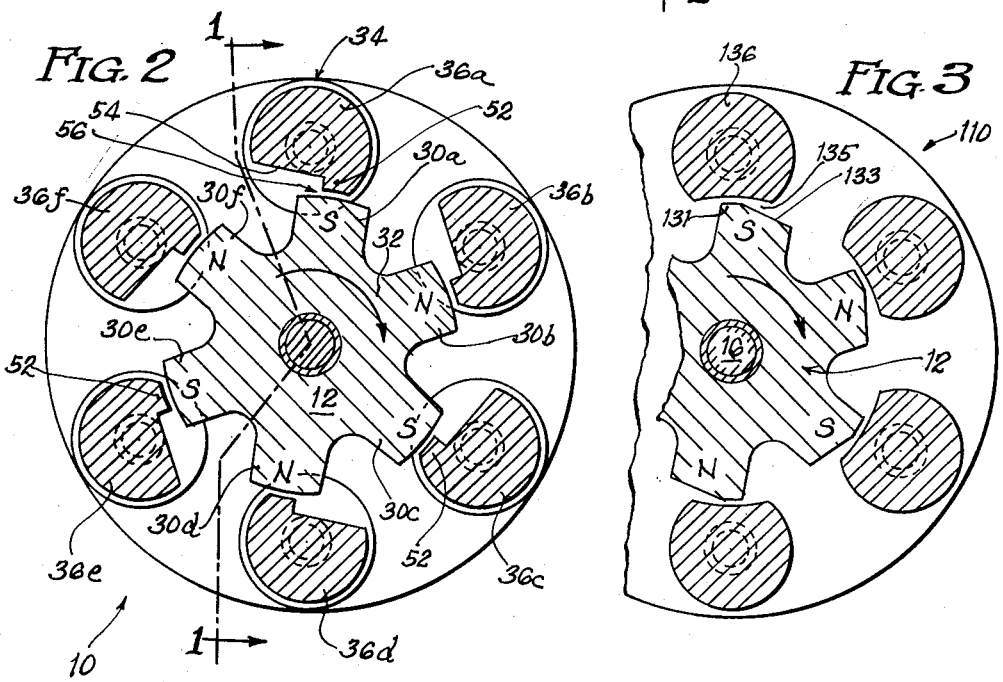
INVENTOR.
John M. Andrews
BY
Ooms, McDougall, Williams & Hersh
Attorneys March 10, 1964  J. M. ANDREWS  3,124,733
PERMANENT MAGNET MOTORS
Filed June 6, 1960
5 Sheets-Sheet 2

INVENTOR.
John M. Andrews
BY
Ooms, McDougall, Williams & Hersh
Attorneys

March 10, 1964  J. M. ANDREWS  3,124,733
PERMANENT MAGNET MOTORS
Filed June 6, 1960  5 Sheets-Sheet 3

INVENTOR.
John M. Andrews
BY
Ooms, McDougall
Williams & Hersh
Attorneys

March 10, 1964 J. M. ANDREWS 3,124,733
PERMANENT MAGNET MOTORS
Filed June 6, 1960 5 Sheets-Sheet 4

INVENTOR.
John M. Andrews
BY Owens, McDougall,
Williams & Hersh
Attorneys

March 10, 1964  J. M. ANDREWS  3,124,733
PERMANENT MAGNET MOTORS

Filed June 6, 1960  5 Sheets-Sheet 5

INVENTOR.
John M. Andrews
BY Ooms, McDougall,
Williams & Hersh
Attorneys

United States Patent Office 3,124,733
Patented Mar. 10, 1964

3,124,733
PERMANENT MAGNET MOTORS
John M. Andrews, Evanston, Ill., assignor to Cook Electric Company, Chicago, Ill., a corporation of Delaware
Filed June 6, 1960, Ser. No. 34,275
16 Claims. (Cl. 318—138)

This invention relates to new and improved motors intended primarily for operation on direct current.

One object of the present invention is to provide a new and improved motor which employs permanent magnet rotor poles and electromagnet stator poles. It will be understood, of course, that there may be a reversal of parts between the permanent magnet and electromagnet poles, so that the permanent magnet poles will be stationary, while the electromagnet poles are rotatable.

A further object is to provide a new and improved motor of the foregoing character which is always self-starting and which provides high starting torque.

Another object is to provide a new and improved motor of the foregoing character which develops high starting and operating torque, yet operates with an extremely low current.

A further object is to provide a new and improved motor which may readily be made extremely compact and small in size, yet is capable of developing a large amount of power.

Another object is to provide a new and improved motor which is extremely versatile and is readily adaptable for use either as a stepping motor or as a continuously rotatable motor.

A further object is to provide a new and improved motor of the foregoing character which may be equipped with a simple commutator so as to produce continuous rotation.

Another object is to provide a new and improved motor which utilizes transistors, or equivalent electronic switching elements, in lieu of a commutator.

Another object is to provide a motor whose locked rotor current may be equal to its normal running current without loss of torque.

Another object is to provide transistor-operated motors of the foregoing character which may operate either as stepping motors or as continousuly rotatable motors.

A further object is to provide a new and improved permanent magnetic motor of the foregoing character having means for reversing the direction of rotation of the motor.

Another object is to provide a new and improved stepping motor which is adapted to advance step by step in response to the closing and opening of a simple two-wire control circuit.

A further object is to provide new and improved motors of the foregoing character which are easy to manufacture and surprisingly low in cost.

Further objects and advantages of the present invention will appear from the following description, taken with the accompanying drawings, in which:

FIG. 1 is a considerably enlarged central longitudinal section of a motor to be described as an illustrative embodiment of the present invention.

FIG. 2 is a cross-sectional view, taken generally along the line 2—2 in FIG. 1.

FIG. 3 is a fragmentary cross-sectional view, similar to FIG. 2, but showing a modified construction.

Figure 4:
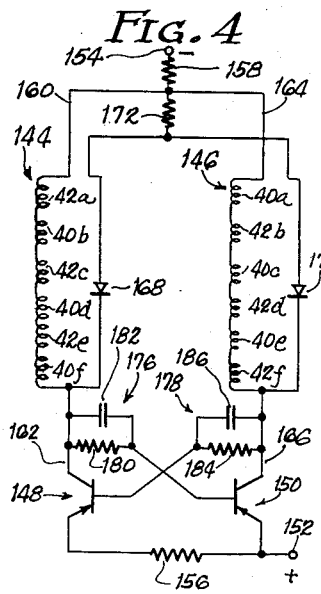
FIGS. 4, 5 and 6 are schematic wiring diagrams illustrating three different circuit arrangements utilizing transistors for operating the motor.

It will be seen that FIGS. 1 and 2 illustrate a permanent magnet motor 10, intended primarily for operation from direct current. In the drawings, the motor is shown to a greatly enlarged scale, over three times the size of a working model which has been made and tested successfully. It will be understood, however, that the motor may be made in various sizes and types. As shown the motor 10 comprises a rotor 12 and a stator assembly or unit 14. However, it will be realized that either of the members 12 and 14 may be the rotary member, with the other serving as the stationary member.

It will be seen that the rotor 12 is secured to a shaft 16 which is rotatably supported by bearings 18 and 20, mounted on front and rear end plates 22 and 24. In this case, the front plate 22 is preferably non-magnetic, while the rear plate 24 is preferably made of iron or some other magnetic material.

The rotor 12 is closely adjacent the front bearing 18. A spacer 26 is mounted on the shaft 16 between the rotor 12 and the rear bearing 20.

The front end of the shaft 16 extends forwardly beyond the front mounting plate 22. Power may be taken from the front end of the shaft 16 by means of a gear 28 or any other suitable element mounted thereon.

The illustrated rotor 12 may be regarded as the field member of the motor 10. In this case, the rotor 12 is made of iron or some other magnetic material and is permanently magnetized.

It will be seen that the rotor 12 has a plurality of salient poles 30 which project outwardly in a substantially radial direction from a central body portion 32.

The rotor 12 is permanently magnetized so that alternate poles are of north and south polarity. Any number of pairs of poles may be provided on the rotor 12. Thus, it is merely by way of example that the illustrated rotor is provided with six poles.

As shown, the stator assembly 14 is provided with a plurality of pole units 34 corresponding in number to the rotor poles 30. Thus, the illustrated motor utilizes six of the stator pole units 34. The stator pole units 34 comprise pole pieces 36 which are arranged in a circle around the rotor 12. Each pole piece 36 is made of iron or other magnetic material.

In the operation of the motor, the pole pieces 36 are magnetized electromagnetically, first with a north polarity and then with a south polarity. The arrangement is such that the pole pieces 34 alternate in polarity around the rotor 12. Thus, at any given time, adjacent pole pieces will be of opposite polarity.

In the illustrated construction, each pole piece 36 is adapted to be magnetized by an electromagnet unit 38. As shown, each electromagnet 38 comprises two coils 40 and 42 which are mounted on a core or rod 44, made of iron or other magnetic material. In each case, the pole piece 36 is mounted on the front end of the corresponding core 44. The two coils 40 and 42 are employed so that they may be energized alternately, to give the pole piece north and south magnetic polarities.

All of the magnetic cores or rods 44 are mounted on the rear supporting plate 24 and are arranged to project forwardly therefrom. As already indicated, the rear mounting plate 24 may be made of magnetic material so as to serve as a magnetic return member between the rear ends of the magnetic cores 44. The front ends of the pole pieces 36 may be supported by a non-magnetic ring 48 mounted immediately behind the front supporting plate 22.

In order that the motor may be positively self-starting, a decided element of asymmetry is introduced into the rotor poles 30, the stator pole pieces 36, or both. The lack of symmetry is considered with respect to a radial plane passing through the center of the pole or pole piece. This point may be stated in various other ways. Thus, it may be considered that either the rotor poles 30 or the stator pole pieces 36 are lopsided. The effect of this asymmetry or lopsidedness is that the gap between each pole 30 and the corresponding pole piece 36 is tapering or non-uniform. This has the effect of shading or twisting the magnetic field so that the magnetic flux between each pole 30 and the corresponding pole piece 36 is shifted or concentrated toward one side portion of the pole piece. Thus, the magnetic field causes the permanent magnet rotor 12 to come to rest with its poles 30 shifted in one rotary direction from the centers of the corresponding pole pieces 36.

In the construction of FIG. 2, the stator pole pieces 36 are asymmetrical, while the rotor poles 30 are symmetrical. Thus, each pole piece 36 has an inwardly projecting portion 52 which is disposed toward one side of the pole piece. The portion 52 extends inwardly into close proximity to the path of the rotor poles 30. Toward the other side of the pole piece 36, a relieved portion 54 is formed which tapers outwardly away from the path of the rotor poles 30. The relieved portion 54 is spaced considerably farther from the path of the rotor poles than is the inwardly projecting portion 52. Thus, a tapering or non-uniform gap 56 is provided between the pole piece 36 and the adjacent rotor pole 30.

It will be seen that the inwardly projecting portion 52 is displaced in a clockwise direction along the path of the rotor poles 30, relative to the center of the pole piece. Thus, the gap 56 tapers or diminishes in a clockwise direction. With this arrangement, the magnetic field of the permanent magnet rotor 12 causes it to come to rest with its poles 30 displaced in a clockwise direction from the centers of the stator pole pieces 36. This relationship is clearly illustrated in FIG. 2. In general, the poles 30 tend to come to rest opposite the inwardly projecting portions 52 on the pole piece 36.

In the initial or rest position of the rotor 12, each rotor pole 30 finds itself relatively close to the next stator pole piece 36 on its clockwise side, while it is relatively remote from the next stator pole piece on its counterclockwise side. To explain this point more explicitly, the rotor poles in FIG. 2 will be designated 30a, b, c, d, e and f. Similarly, the stator pole pieces will be designated 36a, b, c, d, e and f.

Thus, the rotor pole 30a is immediately adjacent the stator pole piece 36a. It will be apparent that the rotor pole 30a is closer to the stator pole piece 36b than it is to the stator pole piece 36f. In this case, the rotor pole 30a has a south magnetic polarity. The motor may be started simply by giving the pole pieces 36b, 36d and 36f a north polarity, while the pole pieces 36a, 36c and 36e are given a south polarity. Due to its closeness, the pole piece 36b will attract the rotor pole 30a. Thus, the rotor 12 will turn in a clockwise direction with a positive starting torque. The attraction of the pole piece 36b is assisted by a repulsion of the pole piece 36a, which has the same magnetic polarity as the pole 30a.

FIG. 3 illustrates a slightly modified motor 110 in which the asymmetry is introduced into the rotor poles, rather than into the stator pole pieces. In this case, the motor 110 has symmetrical stator pole pieces 136, instead of the unsymmetrical pole pieces 36 of FIG. 2. The motor 110 has unsymmetrical rotor poles 130. It will be seen that each rotor pole 130 has an outwardly projecting portion 131, which is disposed on the counterclockwise side of the rotor pole. A tapering, inwardly relieved portion 133 is formed toward the clockwise side of the rotor pole 130. Thus, a non-uniform, tapering gap 135 is formed between each rotor pole 130 and the corresponding stator pole piece 136. The unsymmetrical construction of the pole 130 concentrates the magnetic flux toward the counterclockwise side of each pole, so that the rotor tends to come to rest with the poles 130 displaced in a clockwise direction from the centers of the pole pieces 136. In general, the outwardly projecting portion 131 tends to center itself opposite the corresponding stator pole piece 136. Thus, each pole 130 finds itself closer to the next clockwise stator pole piece than to the next counterclockwise stator pole piece.

Figure 5:
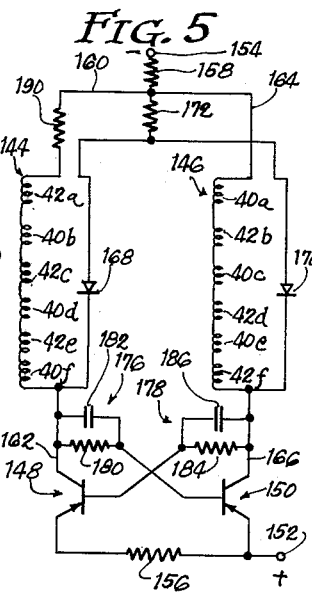
Figure 6:
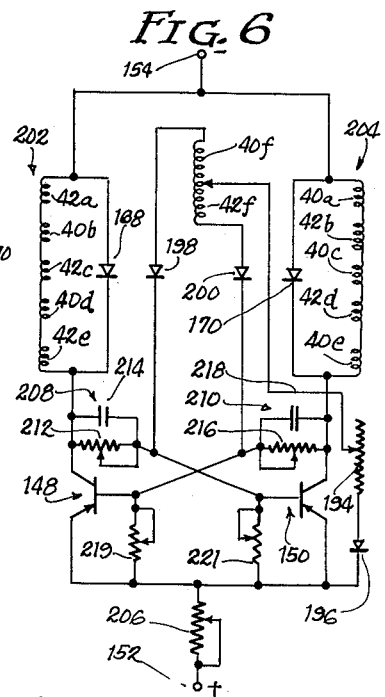

FIGS. 4, 5 and 6 illustrate three different transistor circuits for operating the motor 10. These circuits are equally applicable to the operation of the modified motor 110 of FIG. 3. For convenience, the description of the circuits of FIGS. 4, 5 and 6 will be directed to their application to the operation of the motor 10 of FIGS. 1 and 2. In general, the circuits of FIGS. 4, 5 and 6 constitute free running electronic flip-flop or multivibrator arrangements, which may also be characterized as inverter circuits. The illustrated circuits employ transistors, but in some cases they may employ similar or equivalent electronic switching elements, such as electron discharge tubes.

As already indicated, each stator pole 34 of the motor 10 is provided with two coils 40 and 42. The coil 40 may be employed to magnetize the pole with a north polarity, while the coil 42 is employed to magnetize the pole with the south polarity. Of course, there are six of the coils 40 and six of the coils 42, one for each pole. For convenience of identification, the six coils 40 will be designated 40a, b, c, d, e and f in FIGS. 4, 5 and 6. Similarly, the six coils 42 will be designated 42a, b, c, d, e and f.

In the arrangement of FIG. 4, the twelve coils are arranged so that alternate pole pieces 36 around the stator will always be given alternate polarity. Thus, alternate north coils 40 and the intervening south coils 42 are connected together for joint energization. Thus, the south coils 42a, 42c and 42e are connected in series with north coils 40b, 40d and 40f, to form one set of coils 144. Similarly, the north coils 40a, 40c and 40e are connected in series with the south coils 42b, 42d and 42f to form a second set 146. These sets 144 and 146 are energized alternately in a time sequence, so as to cause the rotor 12 to rotate.

The circuit of FIG. 4 utilizes two transistors 148 and 150 to energize the coil sets 144 and 146 alternately. Thus, the transistors 148 and 150 are connected in series with the respective coil sets 144 and 146 and are arranged to conduct alternately.

The motor arrangement of FIG. 4 receives power from a source of direct current, represented by positive and negative terminals 152 and 154. In this case, the emitter of the transistor 150 is connected directly to the positive terminal 152. A resistor 156 of small value is connected between the terminal 152 and the emitter of the transistor 148. The resistor 156 introduces a slight unbalance into the circuit, so that the circuit gives a slight preference to conduction in the transistor 150. The negative power terminal 154 is connected to the collector of the transistor 148 by a series circuit which comprises a resistor 158, a lead 160, the series connected set of coils 144, and a lead 162. Similarly, the negative terminal 154 is connected to the collector of the transistor 150 by a series circuit which comprises the resistor 158, a lead 164, the series connected set of coils 146, and a lead 166. The resistor 158 is of small value and is connected in the circuits for both transistors to limit any initial surges of current.

Reversely connected diodes 168 and 170 are employed to limit and damp the inductive voltage kicks that would otherwise be generated upon the interruption of current through the series connected sets of coils 144 and 146. The diode 168 and a resistor 172 are connected in series across the coil set 144. Similarly, the resistor 172 and the diode 170 are connected in series across the coil set 146. It will be noted that the resistor 172 is common to both circuits. This resistor is of low value and is effective to limit the peak diode current.

In order to make the circuit of FIG. 4 oscillate as a multivibrator, feedback signals are applied to the bases of the transistors 148 and 150. Thus, cross-connected feedback paths 176 and 178 are provided between the two transistor circuits. Each feedback path extends between the base of one transistor and the collector of the other. The feedback path 176 comprises a resistor 180 in parallel with a capacitor 182. Similarly, the feedback path 178 comprises a resistor 184 in parallel with a capacitor 186.

With the circuit arrangement of FIG. 4, the transistors 148 and 150 will conduct alternately, so that the north and south coils on each stator pole will be energized alternately. The transistors oscillate in a free running manner, in the sense that the oscillation occurs even when the rotor of the motor is held against rotation. This initial oscillation of the transistors produces starting torque which starts the motor. When the rotor of the motor is turning, the frequency of oscillation of the transistors is increased considerably. Thus, the rotation of the rotor causes an increase in the frequency of oscillation, so that a high speed of rotation is achieved by the motor.

It will be realized that the values of the components in the circuit of FIG. 4 may be varied to a considerable extent. However, it may be helpful to give, merely by way of example, a set of values which has been used successfully in actual tests. The following table of values is offered merely to illustrate and explain the invention, and should not be regarded as any limitation on the scope of the invention:

*Values of Components for FIG. 4*

| Component: | | Value |
|---|---|---|
| Each coil 40 | ohms | 25 |
| Each coil 42 | do | 25 |
| 6 coil set 144 | do | 150 |
| 6 coil set 146 | do | 150 |
| 156 | do | 22 |
| 158 | do | 15 |
| 172 | do | 10 |
| 180 | do | 15,000 |
| 184 | do | 10,000 |
| 182 | microfarads | 4 |
| 186 | do | 6 |

FIG. 5 illustrates another circuit arrangement, which is the same as that of FIG. 4, except that another resistor 190 is connected in series with the coil set 144. This resistor is of small value and is effective to introduce a slight additional unbalance between the two transistor circuits, so that the arrangement gives a slight additional preference to conduction in the transistor 150. The other components in FIG. 5 have been given the same reference characters as in FIG. 4.

The various components in FIG. 5 may have the same values as in FIG. 4, or the values may be varied somewhat, if desired. It may be helpful to give another set of values, somewhat different from those given for FIG. 4, which have proven to be successful in actual tests. The values in the following table are given to illustrate the invention, merely by way of example, without any intention to limit the scope of the invention:

*Values of Components for FIG. 5*

| Component: | | Value |
|---|---|---|
| Each coil 40 | ohms | 60 |
| Each coil 42 | do | 60 |
| 6 coil set 144 | do | 360 |
| 6 coil set 146 | do | 360 |
| 156 | do | 20 |
| 158 | do | 50 |
| 172 | do | 20 |
| 180 | do | 10,000 |
| 184 | do | 5,000 |
| 190 | do | 30 |
| 182 | microfarads | 4 |
| 186 | do | 6 |

The motors of the present invention are characterized by extremely low current drain. Thus, with the arrangement of FIG. 5, the current drain with 30 volts applied to the circuit was only 52 milliamperes.

FIG. 6 shows a modified arrangement in which two of the stator coils 40f and 42f are employed to trigger the transistors 148 and 150. This arrangement has the effect of increasing the speed at which the motor operates. It will be seen that these two coils 40f and 42f are connected in series and that the junction or center point between the coils is connected to the emitters of the transistors 148 and 150 through a series circuit which comprises a variable resistor 194 and a reversely connected diode 196. The end of the coil 40f is connected to the base of the transistor 150 through a reversely connected diode 198. Similarly, the end of the coil 42f is connected to the base of the transistor 148 through a reversely connected diode 200. As the motor rotates, signals are developed in the coils 40f and 42f which trigger the transistors 148 and 150 so as to increase the frequency of oscillation and thereby increase the speed of the motor.

Five coils 42a, 40b, 42c, 40d and 42e are connected in a set 202 in series with the emitter of the transistor 148. Thus, the five-coil set 202 is connected between the negative power terminal 154 and the emitter of the transistor 148. In much the same manner as in FIG. 4, the reversely connected diode 168 is connected directly across the five-coil set 202.

Similarly, the five remaining coils 40a, 42b, 40c, 42d, and 40e are connected in a series set 204 between the negative power terminal 154 and the collector of the transistor 150. The reversely connected diode 170 is shunted across the five-coil set 204.

In this case, a current limiting resistor 206 is connected between the positive power terminal 152 and the emitters of the transistors 148 and 150.

As before, cross-connected feedback paths 208 and 210 are provided between the two transistor circuits. Thus, the feedback path 208 is connected between the collector of the transistor 148 and the base of the transistor 150. Similarly, the feedback path 210 is connected between the collector of the transistor 150 and the base of the transistor 148. The feedback path 208 comprises a resistor 212 in parallel with a capacitor 214. Similarly, the feedback path 210 comprises a resistor 216 in parallel with a capacitor 218. Variable resistors 219 and 221 are connected between the bases and the emitters of the transistors 248 and 250.

Again, it may be helpful to give a set of values which have been employed successfully in actual tests of the circuit shown in FIG. 6. The values in the following table are offered merely by way of example, without limiting the scope of the present invention:

Values of Components for FIG. 6

| Component: | | Value |
|---|---|---|
| Each coil 40 | ohms | 12 |
| Each coil 42 | do | 12 |
| 5 coil set 202 | do | 60 |
| 5 coil set 204 | do | 60 |
| 194 | do | 5,000 |
| 206 | do | 25 |
| 212 | do | 25,000 |
| 216 | do | 25,000 |
| 219 | do | 10,000 |
| 221 | do | 10,000 |
| 214 | microfarads | 4 |
| 218 | do | 6 |

Figure 7:
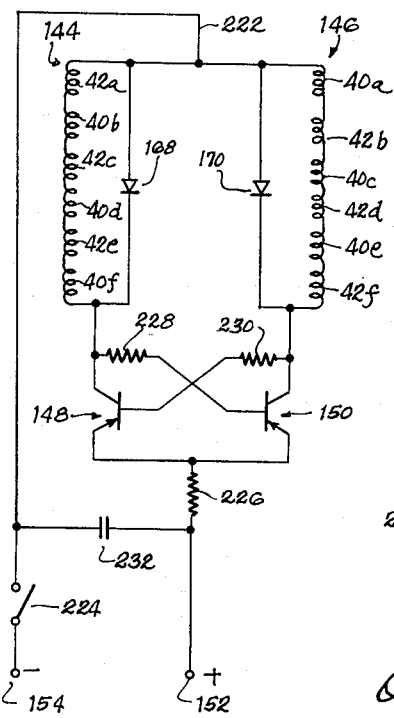
FIGS. 7 and 8 are schematic wiring diagrams showing two different circuits utilizing transistors for operating the motor as a stepping device.
Figure 8:
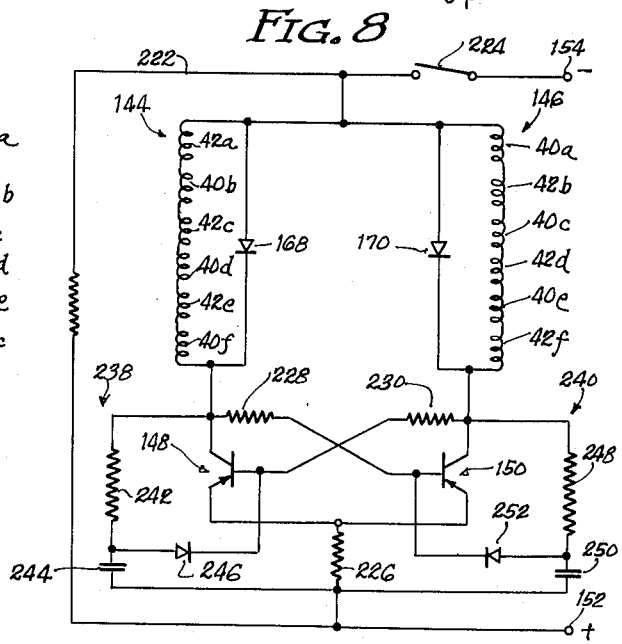

The circuits of FIGS. 4, 5 and 6 are adapted to impart continuous rotation to the motor 10. However, the motor 10 may also be employed as a stepper, adapted to turn in step-by-step fashion for each application of energizing power. Each time that power is applied, the rotor advances by the interval between adjacent poles. In this case, since there are six poles, the rotor advances through ⅙ of a revolution, or 60 degrees. FIGS. 7 and 8 illustrate circuits for operating the motor as a stepper.

In the arrangement of FIG. 7, the stator coils 40 and 42 are connected in series to form six-coil sets 144 and 146, the same as in FIG. 4. As before, the diodes 168 and 170 are shunted across the coil sets 144 and 146. These diodes are reversely connected so as to suppress the inductive kicks that would otherwise be generated in the coil sets 144 and 146 upon the interruption of current in the coils. As before, the transistors 148 and 150 are connected in series with the coil sets 144 and 146. Thus, the six-coil set 144 is connected between a power lead 222 and the collector of the transistor 148. Similarly, the six-coil set 146 is connected between the power lead 222 and the collector of the transistor 150. A control switch 224 is provided between the negative power terminal 154 and the lead 222. The closing and opening of the switch 224 causes the motor to step.

A current limiting resistor 226 of low value is connected between the positive power terminal 152 and the emitters of the transistors 148 and 150. Feedback or triggering resistors 228 and 230 are cross-connected between the transistor circuits. Thus, the resistor 228 is connected between the collector of the transistor 148 and the base of the transistor 150. Similarly, the resistor 230 is connected between the collector of the transistor 150 and the base of the transistor 148. A triggering capacitor 232 is connected between the positive power terminal 152 and the lead 222.

The circuit of FIG. 7 can operate in two states. In one state, the transistor 148 conducts, while in the other state, the transistor 150 conducts. Thus, the circuit of FIG. 7 constitutes a flip-flop circuit, but one which is not free running. Each time that the switch 224 is closed momentarily, the circuit changes from one state to the other. Thus, for one closure of the switch 224, the transistor 148 may conduct. For the next closure of the switch 224, the transistor 150 will conduct. This has the effect of magnetizing each pole of the motor with alternate north and south polarities. When the polarities of the poles are reversed, the rotor 12 advances through one step.

While the values of the components employed in the arrangement of FIG. 7 may be varied widely, it may be helpful to give a set of values, by way of example, which has been employed successfully in actual tests. The following table of values is offered merely to illustrate and explain the invention, and not to limit the scope of the invention:

Values of Components for FIG. 7

| Component: | | Value |
|---|---|---|
| Each coil 40 | ohms | 15 |
| Each coil 42 | do | 15 |
| 6 coil set 144 | do | 90 |
| 6 coil set 146 | do | 90 |
| 226 | do | 15 |
| 228 | do | 3,300 |
| 230 | do | 3,000 |
| 232 | microfarads | 10 |

FIG. 8 illustrates a stepper circuit which is somewhat similar to that of FIG. 7, but is modified to some extent. Corresponding components in FIGS. 7 and 8 have been given the same reference characters. In FIG. 8, the capacitor 232 is omitted. However, triggering circuits 238 and 240 are connected in circuit with the transistors 148 and 150. The circuit 238 comprises a resistor 242 and a capacitor 244 which are connected in series between the collector of the transistor 148 and the positive power terminal 152. A diode 246 is connected between the junction of the resistor 242 and the capacitor 244 and the base of the transistor 148. The diode 246 is polarized so as to conduct toward the base of the transistor 148.

Similarly, the circuit 240 comprises a resistor 248 and a capacitor 250 which are connected in series between the collector of the transistor 150 and the positive power terminal 152. A diode 252 is connected to the junction between the resistor 248 and 250 and is polarized to conduct toward the base of the transistor 150.

A resistor 256 is connected between the positive power terminal and the negative power lead 222. This resistor facilitates the discharge of the capacitors 244 and 250 when the switch 224 is opened.

While components of various values may be employed in the circuit arrangement of FIG. 8, it may be helpful to give a set of values, by way of example, which has been employed successfully in actual tests. The following table of values is offered merely to illustrate and explain the invention, without any intention to limit the scope of the invention:

Values of Components for FIG. 8

| Component: | | Value |
|---|---|---|
| Each coil 40 | ohms | 15 |
| Each coil 42 | do | 15 |
| 6 coil set 144 | do | 90 |
| 6 coil set 146 | do | 90 |
| 226 | do | 5 |
| 228 | do | 3,000 |
| 230 | do | 3,000 |
| 242 | do | 10,000 |
| 248 | do | 10,000 |
| 256 | do | 10,000 |
| 244 | microfarads | 2 |
| 250 | do | 2 |

When the switch 224 is closed, one of the transistors 148 and 150 will conduct. The next time that the switch 224 is closed, the other transistor will conduct. Thus, the rotor of the motor will be advanced step by step.

The current drain of the stepping arrangement is also remarkably low. Thus, the arrangement of FIG. 8 has been operated with a current drain of only 250 milliamperes at 30 volts.

It will be apparent that the present invention provides motors in which commutators are entirely dispensed with. In each case, the motor is operated by an electronic switching circuit. Nevertheless, the motor is positively self-starting, and is capable of developing a substantial starting torque. The current drain of the motor circuit is remarkably low, yet high power output and torque are achieved. With different circuit arrangements, the motor may be operated either as a continuously rotating source of mechanical power, or in a step-by-step fashion. In the case of the continuously rotating motor, there is an interaction between the electronic switching circuit and the motor so that the rotation of the motor causes the frequency of oscillation of the electronic switching circuit to increase. Thus, the motor is capable of operating at high speed, yet will provide high starting torque. In the case of the stepper, the circuit and the motor interact to provide a memory factor, so that the conduction in the switching circuit will alternate between its two states as electric power is applied to the circuit momentarily for a series of intervals. Thus, the motor will advance through one step upon each occasion that the circuit is energized.

The motor may be made in extremely small sizes, or in larger sizes, if greater power is desired. The electronic switching circuit for the motor may also be made extremely compact. Inasmuch as the motor does not have any brushes or commutator to wear out, the motor requires very little maintenance. The absence of commutator sparking makes it easy to use the motor in an explosive atmosphere. With all of these features and advantages, the motor is remarkably easy to manufacture and low in cost.

It has already been indicated that the permanent magnet motors of the present invention may be employed either as stepping motors or to produce continuous rotation. FIG. 10 illustrates a stepping motor arrangement which may employ the basic motor 110 of FIG. 3. Of course, the arrangement of FIG. 9 may alternatively employ the motor 10 of FIGS. 1 and 2. The motor 110 is shown in a smaller diagrammatic sketch in FIG. 9, but the construction of the motor may be the same as illustrated in FIG. 3.

As in the previously described arrangements, all of the stator coils 40 may be connected in a single series circuit having terminal leads 260 and 262. All of the other sets of stator coils 42 are connected in another series circuit having terminal leads 264 and 266. A switching arrangement is provided for alternately energizing the coils 40 and 42. As already explained this causes the stator poles 136 to alternate between north and south magnetic polarities. As a result, the rotor 12 advances step by step.

Figure 9:
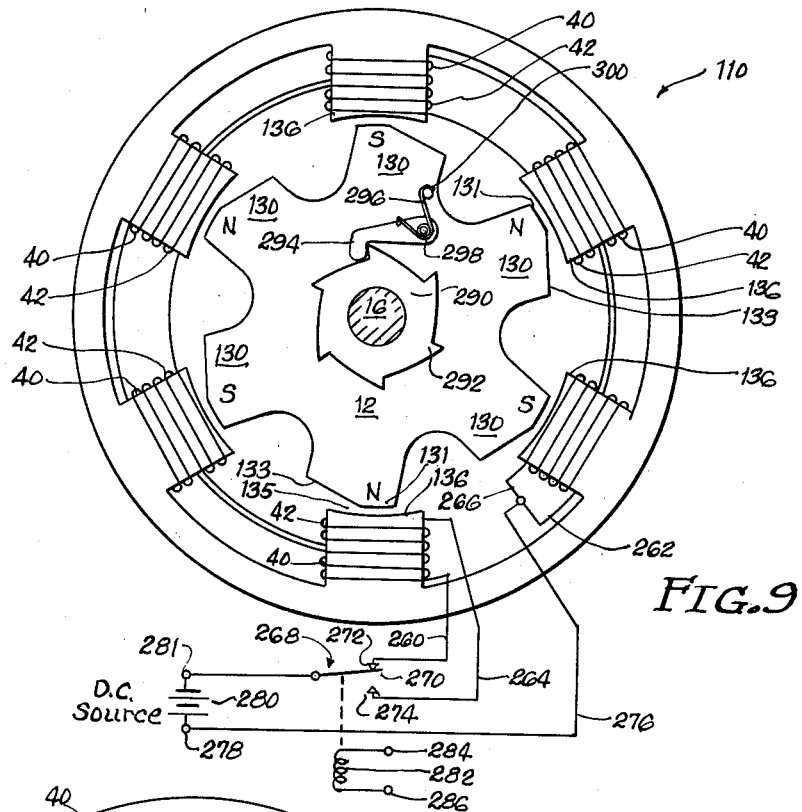
FIG. 9 is a somewhat diagrammatic view, similar to FIG. 3, but showing a modified arrangement whereby the motor is operated as a stepping motor.
Figure 10:
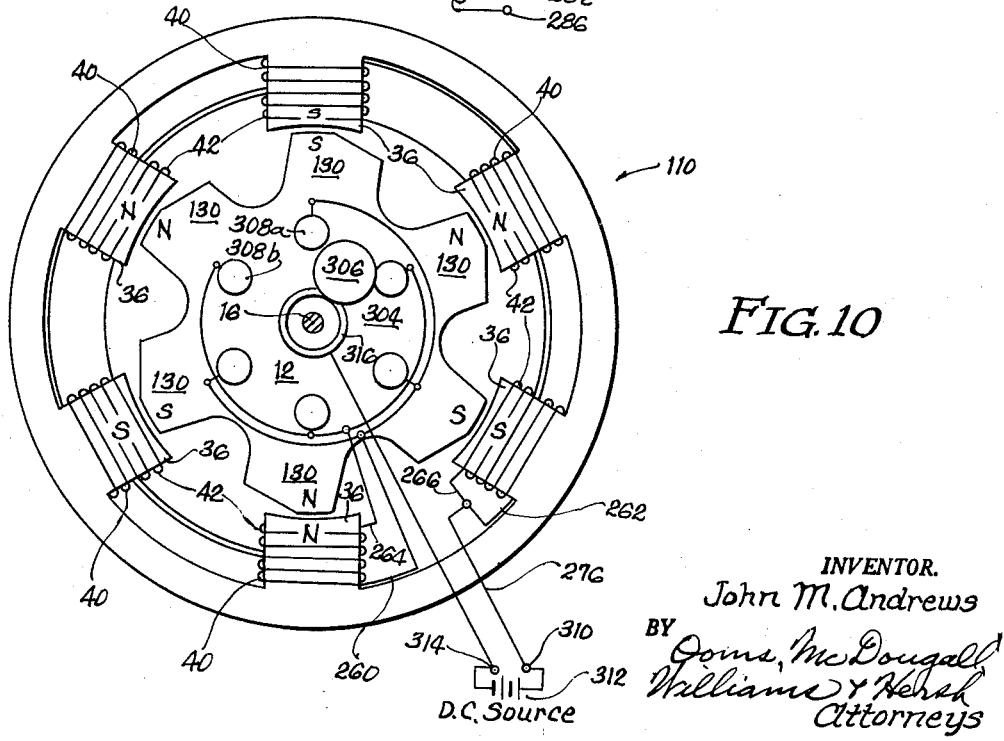
FIG. 10 is a diagrammatic view, similar to FIGURE 3, showing a modified motor which is equipped with a commutator so that the motor will rotate continuously.

In the arrangement shown in FIG. 9 the coils 40 and 42 are energized alternatively by a single pole double-throw switch 268 having a movable contact 270 which is engageable with either of a pair of fixed contacts 272 and 274. The contact 272 is connected to the terminal lead 260 for the coils 40, while the contact 274 is connected to the terminal lead 264 for the coils 42. The other terminal leads 262 and 266 for the stator coils 40 and 42 are connected in common to a lead 276 which extends to one terminal 278 of a battery 280, or some other source of direct current. The movable contact 270 is connected to the other terminal 281 of the direct current source. Various manual, mechanical or other means may be employed to operate the switch 268 so as to move the contact 270 between the contacts 272 and 274. As shown, the switch 268 may be operated by a relay coil 282 having terminals 284 and 286 connected to a suitable control circuit. When the relay coil 282 is energized, the contact 270 is moved from the contact 272 to the contact 274. This causes the rotor 12 to advance through one step, equal in angular magnitude to the angle between the adjacent rotor poles 130. When the relay coil 282 is de-energized, the rotor 12 advances through another step.

It is sometimes desirable to provide a ratchet or detent arrangement which will positively prevent the rotor 12 from turning in the reverse direction, and will tend to prevent the rotor from overshooting as it is advanced step by step. Thus, in the arrangement of FIG. 9, a ratchet wheel or disk 290 is mounted on the rotor shaft 16. The ratchet wheel 290 has ratchet teeth 292 corresponding in number to the number of rotor poles 130. A movable detent pawl or dog 294 is biased against the ratchet wheel 290 by a spring 296. The pawl 294 may be swingably mounted upon a fixed pivot 298. The spring 296 may react against a fixed stop 300. The engagement of the pawl 294 with the ratchet wheel 290 prevents the rotor 12 from turning in a counter-clockwise direction, the normal direction of operation of the rotor being clockwise. Moreover, the friction of the pawl 294 against the ratchet wheel 290 restrains the rotor from overshooting as it advances step by step.

Figure 11:
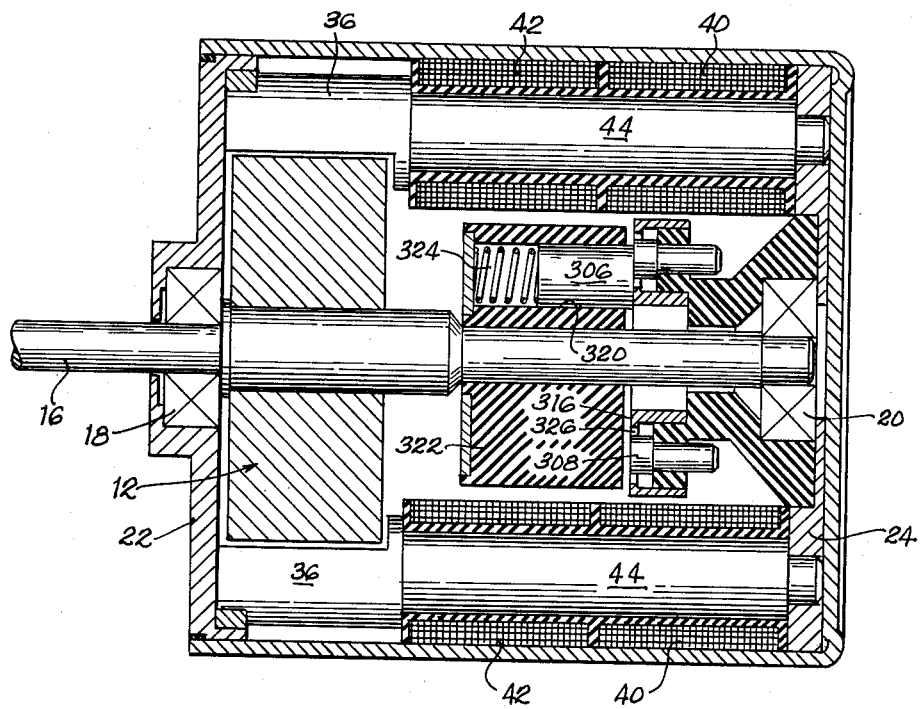
FIG. 11 is a central longitudinal section somewhat similar to FIG. 1, but showing the commutator motor of FIG. 10.

It has already been disclosed herein that the two sets of stator coils may be energized alternately by a transistor circuit, so as to cause the rotor to advance step by step, or to produce continuous rotation of the rotor. Moreover, the arrangement of FIG. 9 illustrates that the stator coils may be energized alternately by a simple switching arrangement, so as to produce a stepping motor. FIG. 10 and FIG. 11 illustrate another modified arrangement, in which the two sets of stator coils 40 and 42 are energized alternately by means of a commutator 304, in synchronism with rotation of the rotor 12, so as to produce continuous rotation of the rotor. It will be seen that FIGS. 10 and 11 illustrate the basic permanent magnet motor 110 of FIGS. 1 and 3. In this case the commutator 304 is stationary, and is adapted to be engaged by a single rotary brush 306. Thus, the commutator arrangement is extremely simple, yet effective.

It will be seen that the commutator 304 has a plurality of contacts or segments 308 which correspond in number to the number of rotor poles 130. For convenience, alternate commutator segments will be designated as 308a and 308b. As in the arrangement of FIG. 9, all of the coils 40 are connected in one circuit while the coils 42 are connected in another circuit. The commutator segments 308a are connected to the terminal lead 260 of the coils 40. Similarly, the commutator segments 308b are connected to the terminal lead 264 of the coils 42. The common lead 276 of the coils 40 and 42 is connected to one terminal 310 of a battery 312 or some other source of direct current. The other terminal 314 of the battery is connected to a slip ring 316 which makes contact with the rotary brush 306.

It will be seen from FIG. 10 that the width of the brush 306 is such that it makes contact alternately with the commutator segments 308a and 308b. Thus, as the rotor 12 turns the coils 40 and 42 are alternately energized so that the stator poles 36 will alternately be given north and south magnetic polarities. The point of commutation occurs with the rotor 12 in approximately the position shown in FIG. 10. In this position, the rotor poles 130 are approximately at dead center with respect to the stator poles 36. When the commutation occurs the polarity of the stator poles is reversed. Thus, each stator pole is given the same magnetic polarity as the adjacent rotor pole. Accordingly, the rotor poles are repelled from the adjacent stator poles and are attracted into alignment with the succeeding stator poles. The rotation of the rotor 12 is always in one direction, because of the shaded or asymmetrical construction of the poles. While FIG. 10 shows the pole construction of FIG. 3, the pole construction of FIG. 2 may be employed equally well.

Various mechanical details of the commutator and brush arrangement are illustrated in FIG. 11. It will be seen that the commutator segments 308 take the form of round button contacts which are spaced in a circle around the shaft 16 and are disposed in a common plane extending at right angles to the shaft. The brush 306 may be mounted in a bore 320 which is formed in an insulating carrier 322 secured to the shaft 16. A spring 324 biases the brush 306 against the commutator 308 and the slip ring 316. The commutator segments or contacts 308 project through openings 326 which are formed in the slip ring 316. Thus, the brush 306 acts as a bridge between the slip ring 316 and each of the commutator segments 308 in turn. This commutator construction may be made extremely compact so that it may be mounted in the space within the circle of the stator coils 40 and 42.

Figure 12:
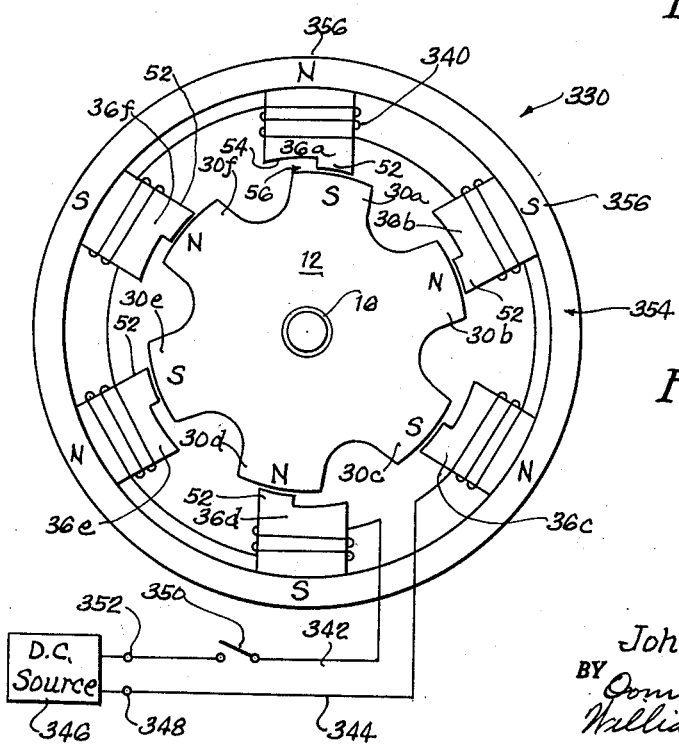
FIG. 12 is a diagrammatic view, somewhat similar to FIG. 2, but showing a modified stepping motor arrangement.

FIG. 12 illustrates a modified stepping motor 330 which is generally quite similar to the motor 10 of FIGS. 1 and 2. Thus, the rotor 12 and the stator poles 36 of the motor 330 may be the same as in the motor 10. However, only one coil 340 is provided on each of the stator poles 36. All of the coils 340 may be connected in a single circuit terminating in leads 342 and 344. This circuit is adapted to be energized by a direct current source 346. The lead 344 is connected directly to one terminal 348 of the direct current source 346. It will be seen that a single-pole, single-throw switch 350 is connected between the lead 342 and the other terminal 352 of the direct current source 346. Thus, the coils 340 will be energized when the switch 350 is closed.

In order that the poles 36 may reverse in polarity, an arrangement is provided whereby the poles are magnetically biased. In this case, the magnetic bias is accomplished by a permanent magnet 354 having a plurality of poles 356 corresponding in number to the pole pieces 36. The poles 356 are alternately north and south in magnetic polarity. As shown, the permanent magnet 354 is circular in form. The poles 356 merely constitute areas which are spaced around the magnet. These areas are opposite the pole pieces 36.

Thus, the permanent magnet 354 gives each of the pole pieces 36 an initial magnetic polarity. When the coils 340 are energized, the magnetizing force of the coils overcomes the force of the permanent magnet, so that the polarities of the pole pieces are reversed. Thus, the rotor 12 will advance one step when the coils 340 are energized and another step when the coils are de-energized. It will be recognized that the stepping motor may be controlled by a simple two-wire circuit which is alternately energized and de-energized. Thus, the stepping motor may be employed with even the simplest control arrangement. It will be recognized that the pole construction of FIGURE 3 may be employed instead of the pole construction of FIG. 2, if desired.

Figure 13:
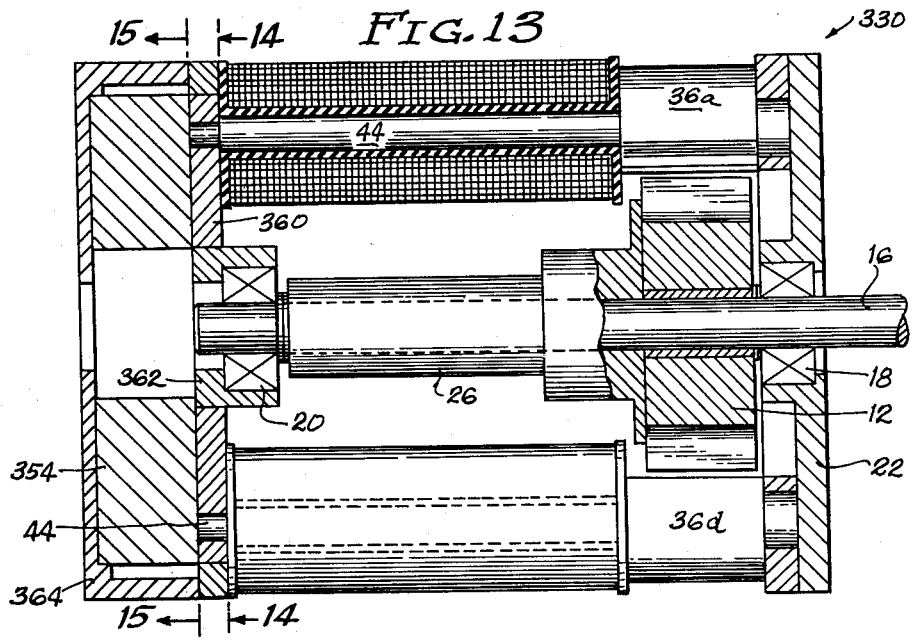
FIG. 13 is a central longitudinal section, similar to FIG. 1, but showing the stepping motor of FIG. 12.
Figure 14:
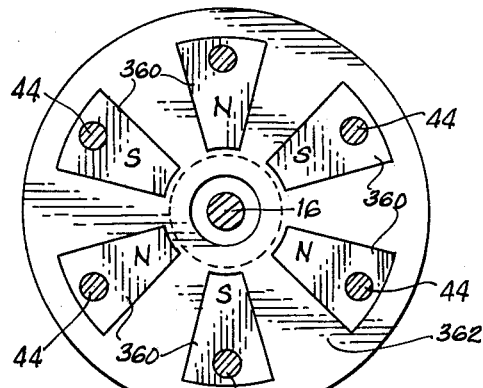
FIG. 14 is a sectional view along a line 14—14 in FIG. 13.
Figure 15:
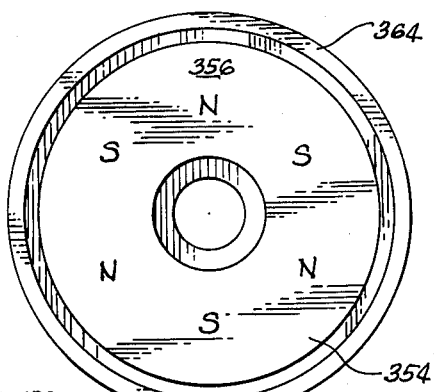
FIG. 15 is a sectional view along a line 15—15 in FIG. 13.

The stepping motor 330 is illustrated diagrammatically in FIG. 12. FIGS. 13, 14 and 15 illustrate various mechanical details of the stepping motor 330. It will be seen that the permanent magnet 354 may take the form of a flat circular disk or ring which engages the rear ends of the magnetic cores 44. As shown in FIGS. 13 and 14 the rear ends of the cores 44 may be mounted in segments 360 which are fitted into a supporting plate 362. The circular permanent magnet 354 engages the rear faces of the segments 360. The segments 360 may be made of iron or other magnetic material while the supporting plate 362 may be made of a non-magnetic material such as brass or the like. Thus, the segments 360 provide magnetic paths of low reluctance between the circular permanent magnet 354 and the cores 44 of the pole pieces 36. Of course, the permanent magnet 354 is oriented so that its pole areas 356 are aligned with the segments 360. A suitable retainer 364 may be employed to hold the permanent magnet 354 against the segments 360. It would be understood that the magnetic biasing arrangement may assume various forms and that the circular permanent magnet is illustrated merely by way of example.

Figure 16:
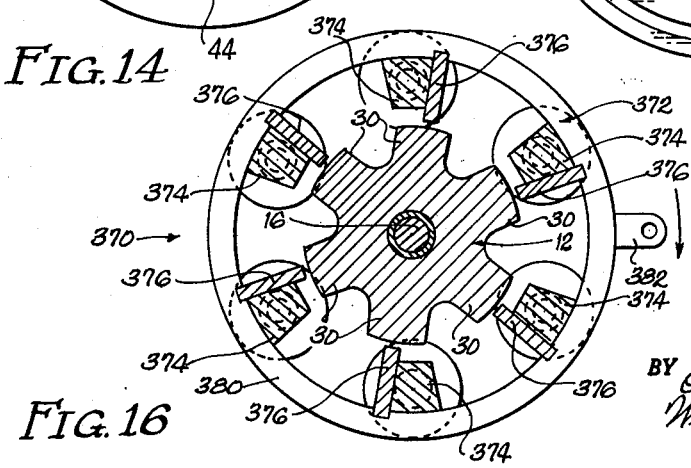
FIG. 16 is a sectional view somewhat similar to FIG. 2, but showing a modified motor having means for reversing the direction of operation of the motor.

In the permanent magnet motors described thus far, the direction of rotation is determined by the direction in which the pole construction is shaded or rendered asymmetrical. FIG. 16 illustrates a modified permanent magnet motor 370 having means whereby the direction of rotation may be reversed. It will be seen that the motor 370 employs the same rotor 12 as in FIGS. 1 and 2. However, modified stator poles 372 are employed instead of the poles 36. Each pole 372 comprises a substantially symmetrical main member or pole piece 374 which is spaced outwardly a substantial distance from the rotor 12. As shown, each of the members 374 is in the shape of a keystone. A plurality of shading members or auxiliary pole pieces 376 are movable into engagement with the side portions of the main pole pieces 374. Thus, each movable member 376 is movable between the righthand side of one pole piece 374 and the lefthand side of the adjacent pole piece. The members 374 and 376 are made of iron or other magnetic metal. It will be seen that the auxiliary pole pieces 376 extend inwardly beyond the main pole pieces 374, into close proximity to the rotor poles 30. Thus, the auxiliary pole pieces 376 shade or twist the magnetic field toward one side of each of the main pole pieces 374. The combined action of the main pole pieces 374 and the movable pole pieces 376 is similar to that of the poles 36 of FIG. 2.

As shown in FIG. 16, each of the movable pole pieces 376 is engaging the righthand side of the corresponding main pole piece 374. Thus, the magnetic field is shaded to the right so that the rotor 12 will rotate clockwise when the magnetic polarity of the pole pieces 374 is reversed. The auxiliary pole pieces 376 are mounted on movable non-magnetic supporting ring 380 so that the auxiliary pole pieces 376 may be moved in a clockwise direction, against the lefthand sides of the main pole pieces 374. The magnetic field will then be shaded or twisted to the left so that the rotor 12 will rotate counterclockwise. An arm or lever 382 may be mounted on the supporting ring 380 so that it may readily be rotated. If desired, a suitable linkage may be connected to the arm 382 so that the motor may be reversed by mechanical, electromagnetic or other means.

Thus, it will be apparent that the present invention provides permanent magnet motors which are highly versatile and are adapted to perform a wide variety of functions. The motors of the present invention may be operated so as to rotate continuously or to advance step by step. The motors are always self-starting and are adapted to produce high starting torque. High operating or pullout torque is also available, yet the operating current of the motors is extremely low.

The motors of the present invention may be operated under the control of simple mechanical switches or commutators. However, commutators and mechanical switches may be dispensed with in favor of circuits employing transistors or other electronic switching components. The entire motor, along with its transistor control circuits may be packaged in an extremely compact unit.

Various other modifications, alternative constructions and equivalents may be employed without departing from the true spirit and scope of the invention, as exemplified in the foregoing description and defined in the following claims.

I claim:

1. In a motor, the combination comprising a set of electromagnet stator poles, a set of permanent magnet rotor poles, said sets having equal numbers of poles, said rotor poles being rotatable closely adjacent said stator poles, said rotor and stator poles being disposed around concentric circles, said rotor poles being of alternate magnetic polarity around the corresponding circle, each of said stator poles having first and second coils thereon for magnetizing said pole with opposite magnetic polarities, means connecting half of said coils into a first set comprising every other first coil and the intervening second coil, means connecting the remaining coils into a second set, each pole of one of said sets of poles having a projecting portion extending toward the poles of the other set and disposed asymmetrically with respect to the central radial plane of the pole so that said rotor poles will come to rest out of alignment with said stator poles, all of said projecting portions being displaced in the same angular direction from said central radial planes of the corresponding poles, and means for energizing said sets of coils alternately to turn said rotor poles.

2. The combination of claim 1, in which said last-mentioned means comprises first and second transistors connected in series with said first and second sets of coils, and a feedback circuit interconnecting said transistors so that said transistors will conduct alternately.

3. The combination of claim 1, in which said projecting portion is formed on each of said permanent magnet rotor poles.

4. The combination of claim 1, in which said last-mentioned means comprises a commutator operable in response to the rotation of said rotor poles for alternately energizing said first and second sets of stator coils to cause continuous rotation of said rotor poles.

5. The combination of claim 1, in which said projecting portions comprise auxiliary pole members engageable with the sides of the electromagnet stator coils and projecting therefrom toward the permanent magnet rotor poles, and means supporting said auxiliary pole members for movement between opposite sides of adjacent stator poles to reverse the direction of rotation of said rotor poles.

6. The combination of claim 1, in which said projecting portions comprise auxiliary pole members movable between adjacent electromagnet stator poles for reversing the direction of rotation of said permanent magnet rotor poles.

7. In a motor, the combination comprising a set of electromagnet stator poles, a set of permanent magnet rotor poles, said sets having equal numbers of poles, said rotor poles being rotatable closely adjacent said stator poles, said rotor and stator poles being disposed around concentric circles, said rotor poles being of alternate magnetic polarity around the corresponding circle, each of said stator poles having first and second coils thereon for magnetizing said pole with opposite magnetic polarities, means connecting half of said coils into a first set comprising every other first coil and the intervening second coils, means connecting the remaining coils into a second set, each pole of one of said sets of poles having projecting portion extending toward the poles of the other set and disposed asymmetrically with respect to the central radial plane of the pole so that said rotor poles will come to rest out of alignment with said stator poles, all of said projecting portions being displaced in the same angular direction from said central radial planes of the corresponding poles, first and second transistors connected in series with said first and second sets of coils, and a multivibrator circuit interconnecting said transistors so that said transistors will conduct alternately to magnetize said stator poles with alternate magnetic polarities in a time sequence.

8. In a motor, the combination comprising a set of electromagnet stator poles, a set of permanent magnet rotor poles, said rotor poles being rotatable closely adjacent said stator poles, said rotor and stator poles being disposed in concentric circles, said rotor poles being of alternate magnetic polarity around the corresponding circle, each of said stator poles having first and second coils thereon for magnetizing said pole with opposite magnetic polarities, means connecting half in number of said coils into a first set comprising every other first coil and the intervening second coil, means connecting the remaining coils into a second set, each pole of one of said sets of poles having a projecting portion extending toward the poles of the other set and disposed asymmetrically with respect to the central radial plane of the pole so that said rotor poles will come to rest out of alignment with said stator poles, all of said projecting portions being displaced in the same angular direction from said central radial planes of the corresponding poles, and electronic switching means for energizing said first and second set of coils alternately, to magnetize said stator poles with alternate magnetic polarities in a time sequence.

9. In a motor, the combination comprising a set of permanent magnet poles, a set of electromagnet poles, said permanent magnet poles and said electromagnet poles being arranged in concentric circles, one within another, one set of said poles being rotatable while the other set is stationary, said permanent magnet poles alternating in magnetic polarity around the corresponding circle, said electromagnet poles being of the same number as said permanent magnet poles, first and second sets of coils on said electromagnet poles for magnetizing said poles with either polarity but with said electromagnet poles alternating in polarity around the corresponding circle, each pole of one of said sets of poles having a projecting portion thereon projecting toward the poles of the other set, said projecting portion being asymmetrically disposed with respect to the central radial plane of the pole so that said poles will come to rest with the poles of the rotatable set out of alignment with the poles of the stationary set, all of said projecting portions being displaced in the same angular direction from said central radial planes of the corresponding poles, first and second transistors having current carrying elements connected in series with said first and second sets of coils, said transistors having control elements, and feedback circuits interconnecting said transistor circuits so that said transistors will conduct alternately, each feedback circuit being connected between the control electrode of one transistor and one of the current carrying elements of the other transistor, each feedback circuit comprising a resistor in parallel with a capacitor for producing continuous oscillation in said circuit.

10. In a motor, the combination comprising a set of permanent magnet poles, a set of electromagnet poles, said permanent magnet poles and said electromagnet poles being arranged in concentric circles, one within another, one set of said poles being rotatable while the other set is stationary, said permanent magnet poles alternating in magnetic polarity around the corresponding circle, said electromagnet poles being of the same number as said permanent magnet poles, first and second sets of coils on said electromagnet poles for magnetizing said poles with either polarity but with said electromagnet poles alternating in polarity around the corresponding circle, each pole of one of said sets of poles having a projecting portion thereon projecting toward the poles of the other set, said projecting portion being asymmetrically disposed with respect to the central radial plane of the pole so that said poles will come to rest with the poles of the rotatable set out of alignment with the poles of the stationary set, all of said projecting portions being displaced in the same angular direction from said central radial planes of the corresponding poles, first and second transistors having current carrying elements connected in series with said first and second sets of coils, said transistors having control elements, and feedback resistors interconnecting said transistor circuits so that said transistors will conduct alternately, each feedback resistor being connected between the control electrode of one transistor and one of the current carrying elements of the other transistor.

11. The combination of claim 10, and also comprising a pair of power terminals, said current carrying elements of said first and second transistors being connected in series with said first and second sets of coils across said power terminals, and a capacitor connected across said power terminals.

12. The combination of claim 10, and also comprising a pair of power terminals, said current carrying elements of said first and second transistors being connected in series with said first and second sets of coils across said power terminals, and a resistor connected across said power terminals.

13. The combination of claim 10, in which triggering circuits are connected to said transistors, each triggering circuit comprising an additional resistor connected to one of the current carrying elements of the transistor, a diode connected between the additional resistor and the control element of the transistor, and a capacitor connected between the additional resistor and the other current carrying element of the transistor.

14. In a motor, the combination comprising a stator having a set of electromagnet stator poles, a rotor having a set of permanent magnet rotor poles, said sets having equal numbers of poles, said rotor poles being rotatable closely adjacent said stator poles, said rotor and stator poles being disposed around concentric circles, said rotor poles being of alternate magnetic polarity around the corresponding circle, said stator poles having first and second sets of coils thereon for magnetizing said poles with opposite magnetic polarities, each of said stator poles having a projecting portion extending inwardly toward the rotor poles and disposed asymmetrically with respect to the central radial plane of the stator pole so that said rotor poles will come to rest out of alignment with said stator poles, all of said projecting portions being displaced in the same angular direction from said central radial planes of the corresponding poles, and means for energizing said first and second sets of coils alternately to turn said rotor.

15. In a motor, the combination comprising a set of permanent magnet poles, a set of electromagnet poles, said permanent magnet poles and said electromagnet poles being arranged in concentric circles, one within another, one set of poles being rotatable while the other set is stationary, said permanent magnet poles alternating in magnetic polarity around the corresponding circle, said sets having equal numbers of poles, each of said electromagnet poles having first and second coils thereon for magnetizing said electromagnet poles with either magnetic polarity, each pole of one of said sets of poles having a projecting portion thereon projecting toward the poles of the other set, said projecting portion being asymmetrically disposed with respect to the central radial plane of the pole so that said poles will come to rest with the poles of the rotatable set out of alignment with the poles of the stationary set, all of said projecting portions being displaced in the same angular direction from said central radial planes of the corresponding poles, first and second transistors having current carrying electrodes and control electrodes, a triggering circuit connecting one of said first coils and one of said second coils to said control electrodes of said transistors, means connecting half of the remaining coils into a first set in series with said first transistor, means connecting the other half of the remaining coils into a second set in series with the current carrying electrodes of said second transistor, said first set of coils comprising every other first coil and the intervening second coils, said second set of coils comprising the remainder of said coils, and a feedback circuit interconnecting said transistors so that said transistors will conduct alternately to magnetize said electromagnet poles with alternate magnetic polarities in a time sequence.

16. In a motor, the combination comprising a set of permanent magnet poles, a set of electromagnet poles, said permanent magnet poles and said electromagnet poles being arranged in concentric circles, one within another, one set of said poles being rotatable while the other set is stationary, said permanent magnet poles alternating in magnetic polarity around the corresponding circle, said electromagnet poles being of the same number as said permanent magnet poles, first and second sets of coils on said electromagnet poles for magnetizing said poles with either polarity but with said electromagnet poles alternating in polarity around the corresponding circle, each pole of one of said sets of poles having a projecting portion thereon projecting toward the poles of the other set, said projecting portion being asymmetrically disposed with respect to the central radial plane of the pole so that said poles will come to rest with the poles of the rotatable set out of alignment with the poles of the stationary set, all of said projecting portions being displaced in the same angular direction from said central radial planes of the corresponding poles, first and second transistors having current carrying elements connected in series with said first and second sets of coils, said transistors having control elements, feedback circuits interconnecting said transistor circuits so that said transistors will conduct alternately, each feedback circuit being connected between the control electrode of one transistor and one of the current carrying elements of the other transistor, each feedback circuit comprising a resistor in parallel with a capacitor for producing continuous oscillation in said circuit, and an unbalancing resistor connected in series with one of said transistors.

References Cited in the file of this patent

UNITED STATES PATENTS

| 2,691,112 | Clifford et al. | Oct. 5, 1954 |
| 2,759,104 | Skellet | Aug. 14, 1956 |
| 2,994,026 | Sampietro | July 25, 1961 |
| 3,025,443 | Wilkenson | Mar. 13, 1962 |